US008607178B2

(12) United States Patent
Taylor et al.

(10) Patent No.: US 8,607,178 B2
(45) Date of Patent: Dec. 10, 2013

(54) INTEGRATED CIRCUIT CHIP WITH REPEATER FLOPS AND METHODS FOR AUTOMATED DESIGN OF SAME

(75) Inventors: Stuart A. Taylor, San Jose, CA (US); Victor Ma, Fremont, CA (US); Bharat Patel, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 6 days.

(21) Appl. No.: 13/460,747

(22) Filed: Apr. 30, 2012

(65) Prior Publication Data

US 2012/0221993 A1      Aug. 30, 2012

Related U.S. Application Data

(62) Division of application No. 11/840,660, filed on Aug. 17, 2007, now abandoned.

(60) Provisional application No. 60/838,370, filed on Aug. 18, 2006.

(51) Int. Cl.
*G06F 17/50* (2006.01)

(52) U.S. Cl.
USPC ........... 716/114; 716/100; 716/110; 716/119; 716/122; 716/126

(58) Field of Classification Search
USPC ......... 716/100–106, 110–111, 114, 119–122, 716/126
See application file for complete search history.

(56) References Cited

U.S. PATENT DOCUMENTS

| 6,836,877 B1 | 12/2004 | Dupenloup |
| 7,454,323 B1 | 11/2008 | Bain |
| 7,546,568 B2 | 6/2009 | Dirks et al. |
| 2001/0039634 A1 | 11/2001 | Hecht et al. |
| 2002/0162086 A1 | 10/2002 | Morgan |
| 2002/0184607 A1* | 12/2002 | Alpert et al. ............ 716/15 |
| 2002/0188775 A1 | 12/2002 | Konrad |
| 2003/0226126 A1* | 12/2003 | Iwai et al. .............. 716/6 |
| 2004/0025134 A1* | 2/2004 | Jung et al. ............. 716/13 |
| 2004/0158806 A1* | 8/2004 | Scheffer ................ 716/11 |
| 2005/0251780 A1 | 11/2005 | Nakashiba |
| 2005/0289498 A1 | 12/2005 | Sawkar et al. |
| 2006/0117285 A1* | 6/2006 | Kosugi et al. ........... 716/6 |
| 2007/0165888 A1 | 7/2007 | Weigold |
| 2008/0296628 A1 | 12/2008 | Kaneko |
| 2009/0269767 A1 | 10/2009 | Soderlund et al. |

OTHER PUBLICATIONS

Communication relating to the results of the partial International Search Report issued Feb. 12, 2008 for Appl. No. PCT/US2007/018245, 4 pages.

Seongmoo, Heo et al., "Replacing Global Wires with an On-Chip Network: A Poer Analysis," IEEE, Aug. 8, 2005, pp. 369-374.

(Continued)

*Primary Examiner* — Paul Dinh

(74) *Attorney, Agent, or Firm* — Sterne, Kessler, Goldstein & Fox P.L.L.C.

(57) ABSTRACT

An integrated circuit (IC) chip having repeaters for propagating signals along relatively long wires that extend between and among lower-level physical blocks of the IC chip, wherein the repeaters are implemented as clocked flip-flops (or "repeater flops"). A method for automatically inserting and allocating such repeater flops during the logical and physical design of the IC chip is also provided.

20 Claims, 9 Drawing Sheets

(56) References Cited

OTHER PUBLICATIONS

Bertozzie, Davide et al., "Xpipes: A Network-on-Chip Architecture for Gigascale Systems-on-Chip," IEEE Circuits and Systems Magazine, vol. 4, No. 2, 2004, pp. 18-31.

Tamhankar, R. et al., "Performance Driven Reliable Link Design for Networks on Chips," IEEE, Jan. 18, 2005, pp. 749-754.

Benini, L. et al., "Xpipes: A Network-on-Chip Architecture for Gigascale Systems-On-Chip", IEEE Circuits and Systems Magazine, IEEE Service Center, vol. 4, No. 2, 2004, pp. 18-31.

Ruibing, Lu et al., "Flip-Flop and Repeater Insertion for Early Interconnect Planning", Proceedings 202 Design, 2002, pp. 690-695.

Ruibing, Lu et al., "Interconnect Planning with Local Area Constrained Retiming", IEEE Computer SOC, 2003, pp. 442-447.

Scheffer, L., Methodologies and Tools for Pipelined On-Chip Interconnect:, IEEE Computer SOC, Sep. 16, 2002, pp. 152-157.

Search Report and Written Opinion for International Application No. PCT/US2007/018245 mailed Apr. 10, 2008, 19 pages.

First Examination Report issued Mar. 17, 2012 for European Patent Application No. 07836978.2, 3 pages.

* cited by examiner

INTEGRATED CIRCUIT CHIP WITH REPEATER FLOPS AND METHODS FOR AUTOMATED DESIGN OF SAME

CROSS-REFERENCE TO RELATED APPLICATIONS

This application is a divisional of U.S. Non-Provisional application Ser. No. 11/840,660, filed Aug. 17, 2007, which claims the benefit of U.S. Provisional Application No. 60/838,370 filed Aug. 18, 2006, entitled "Integrated Circuit Chip with Repeater Flops and Method for Automated Design of Same," all of which are incorporated by reference herein in their entirety.

BACKGROUND OF THE INVENTION

1. Field of the Invention

The invention is generally related to integrated circuit (IC) chip design.

2. Related Art

In order to design a very large IC chip, a two-level hierarchical structure is sometimes employed. In accordance with this approach, lower level blocks are developed to a specification and then glued together at an upper level. The lower level blocks are often referred to as "tiles" and when assembled to form the chip, they often have small gaps between each other known as grout. The upper level is often referred to as the "chip-tile." From a connectivity perspective, the only thing that needs to be done at the chip-tile level is ensure connectivity between the various tiles. That is, the chip-tile level must provide wiring that enables tiles that share a signal to propagate the signal from one tile to the other tile. However there are fundamental limitations in the underlying process technology that complicate this step. One issue is that interconnect wires connecting the tiles together are traditionally poor conductors of high speed signals, at least from a resistance and capacitance perspective. For recent IC chip designs, it has been observed that the maximum distance a signal can be driven before it needs to be repeated is about 1 millimeter (mm). Since an IC chip can be upwards of 20 mm on a side, it becomes readily apparent that many repeaters will be needed.

Repeaters are devices that are commonly used to drive long resistive interconnects. Conventionally, the repeaters are buffers, i.e., signal amplifiers. However, there is a limitation to this approach. It still takes time for the signal to pass along the wire. For a recent IC chip design, it has been observed that in a given clock cycle (500 MHz=>2 nS), a signal can travel about 5 mm using 4 repeater buffers. Conventional approaches do not provide a solution to enabling signals to travel greater distances.

A more significant issue is that the interconnect wires are now crossing large tiles that may be, for example, in excess of 4 mm on a side. One therefore needs to insert repeaters over a tile. Unfortunately, due to the limits of conventional process technology, one can only form active devices (e.g., transistors) on the semiconductor substrate, i.e., the bottom layer of the process as opposed to the chip-tile level. Repeaters considered to be active devices. Thus, one now has a choice—one can cut a hole in the tile to allow repeaters to be dropped into it or one can "pre-seed" the tile with repeaters and use them for wires that cross or "fly" over the tile.

What is needed, therefore, is an improved method for using repeaters to carry signals between the low level blocks, or tiles, of an IC chip that overcomes the distance limitation associated with the use of buffer-type repeaters (i.e., the limit on the distance a signal can be driven in a single clock cycle). What is also needed is an improved method that automates the process by which chip designers allocate and insert repeaters into the tiles of the IC chip.

BRIEF SUMMARY OF THE INVENTION

Consistent with the principles of the present invention as embodied and broadly described herein, an IC chip includes a plurality of physical tiles including a first tile and a second tile and an interface configured to carry a signal from the first tile to the second tile. The interface includes a series of repeaters for carrying the signal in a pipelined fashion and each of the repeaters includes at least one of (i) a flip-flop and (ii) a flip-flop coupled with an associated buffer.

The present invention overcomes the distance limitation associated with the use of conventional buffer-type repeaters (i.e., the limit on the distance a signal can be driven in a single clock cycle) by applying a novel pipelining approach in which a signal path between two tiles is broken down into a series of stages. Each stage carries a different "phase" of the signal. In order to implement this approach, an embodiment of the present invention uses a new type of repeater, referred to herein as a "repeater flop." A repeater flop may be implemented as a flip flop with an associated buffer that is used for driving the signal. Through the application of a clock signal to each of the repeater flops along an interconnect, a signal can be driven across the interconnect by traveling from one repeater flop to another per clock cycle.

The use of such repeater flops leads to many complications. For example, repeater flops are much larger than conventional buffer-type repeaters. Thus, chip designers must be careful where the repeater flops are placed. Additionally, as noted above, repeater flops require a clock signal. Since different clocks are typically provided and used within an IC chip, a repeater flop cannot be associated with just any signal wire. Rather, a repeater flop can only be associated with a signal wire that shares the same clock (also referred to as sharing the same "clock color"). Furthermore, the addition of clocked elements, such as repeater flops, to a chip design has an impact on the functionality of the design. Typically, the design must be altered in some way to account for the additional latency.

The present invention further provides a design tool that automatically allocates and inserts repeater flops into the tiles of an IC chip in a manner that addresses the foregoing complications. This automated design tool is used to allocate and insert repeater flops into the tiles of an IC chip that are used for driving signals along wires that cross or "fly" over the tiles of the IC chip. As will be described in more detail herein, the automated design tool can also be used for initial floorplan verification and bus planning.

The automated design tool can identify ideal or optimal placement of repeater flops (as well as an associated wire or bus) based on a set of predefined constraints. For example, in an implementation, the design tool allocates repeater flops and identifies insertion points for the same, taking into account such factors as the physical distance that a signal, to be provided from a first tile to a second tile, must be driven. Also taken into account are logical interface rules, such as whether a signal can be repeated, the maximum number of pipeline stages over which a given signal may be repeated, and which signals must be repeated over the same number of pipeline stages as each other.

Other factors that may be taken into account by the automated design tool include whether a given tile is "frozen" such that design changes cannot be applied to them, the presence or absence of "loose" repeaters in the tile (i.e., repeaters that are present in the design but are not dedicated to a particular signal wire), and the inability of a tile to insert repeaters based on design reasons. However, these factors are provided by way of example only and are not intended to limit the present invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 7:
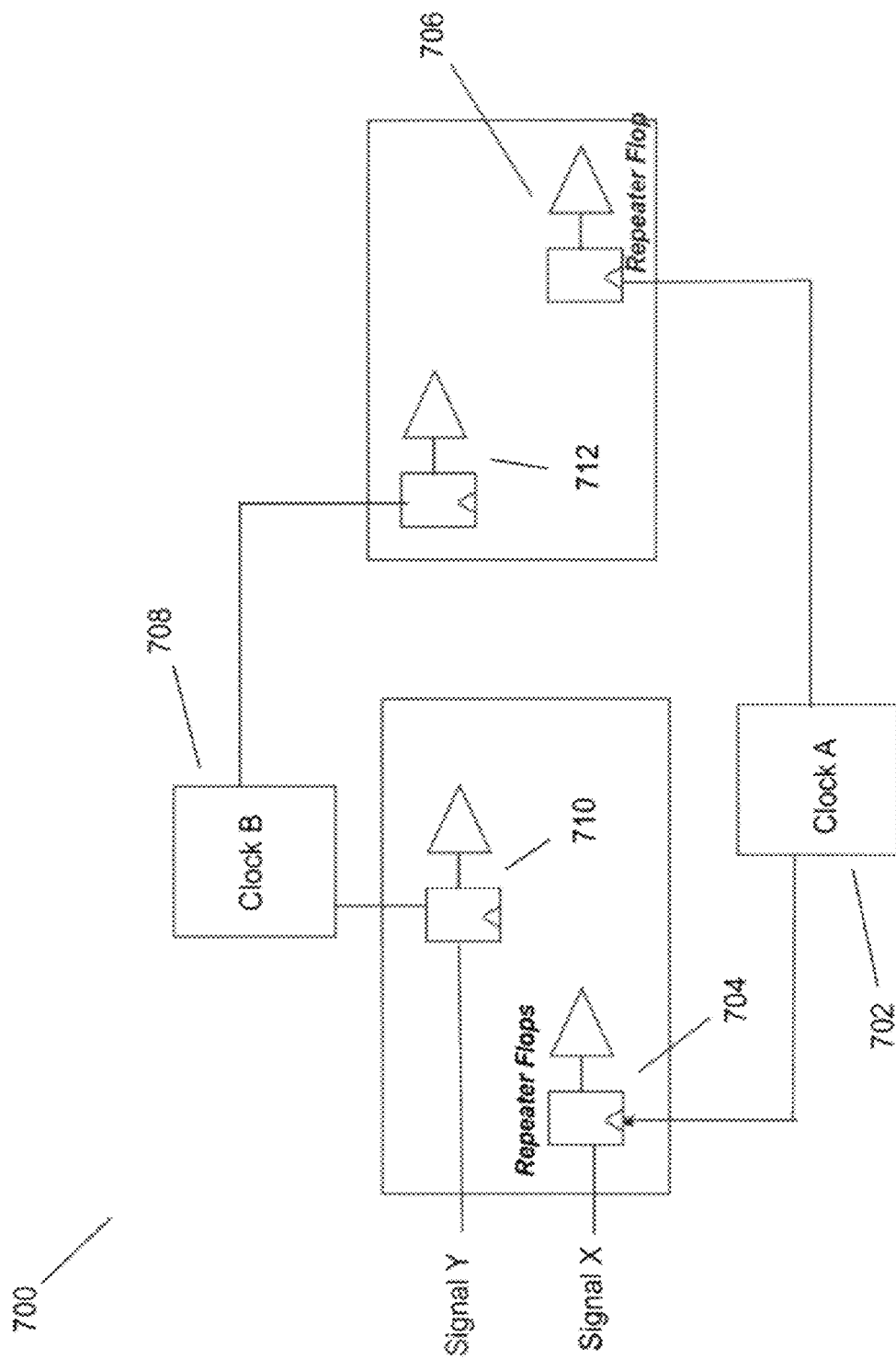

FIG. 7. is an illustration of an embodiment of the present invention showing an alternative clock and repeater flop arrangement.

Figure 8:
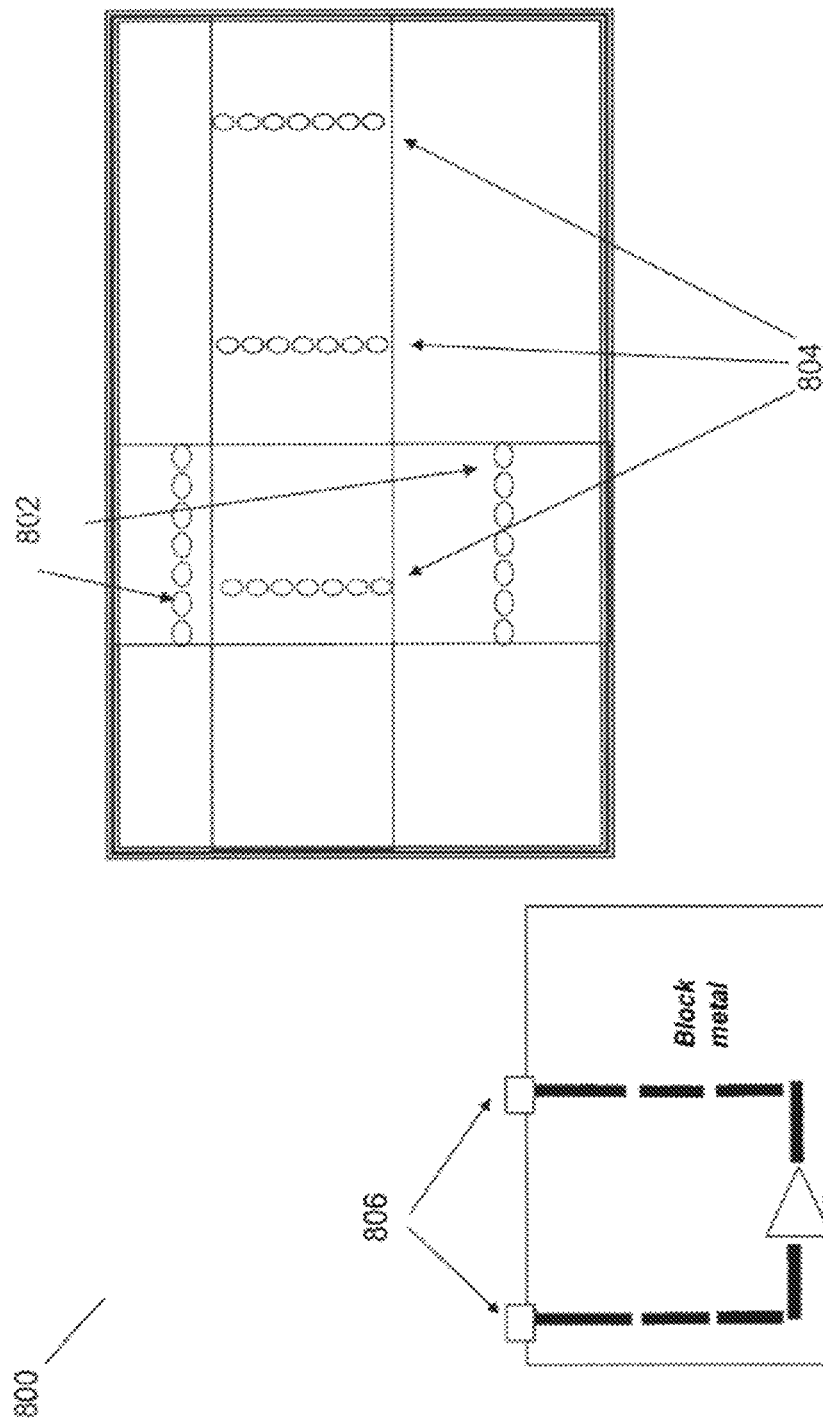

FIG. 8. is an illustration of repeater flop insertion from the tile or block perspective in accordance with an embodiment of the present invention.

Figure 9:
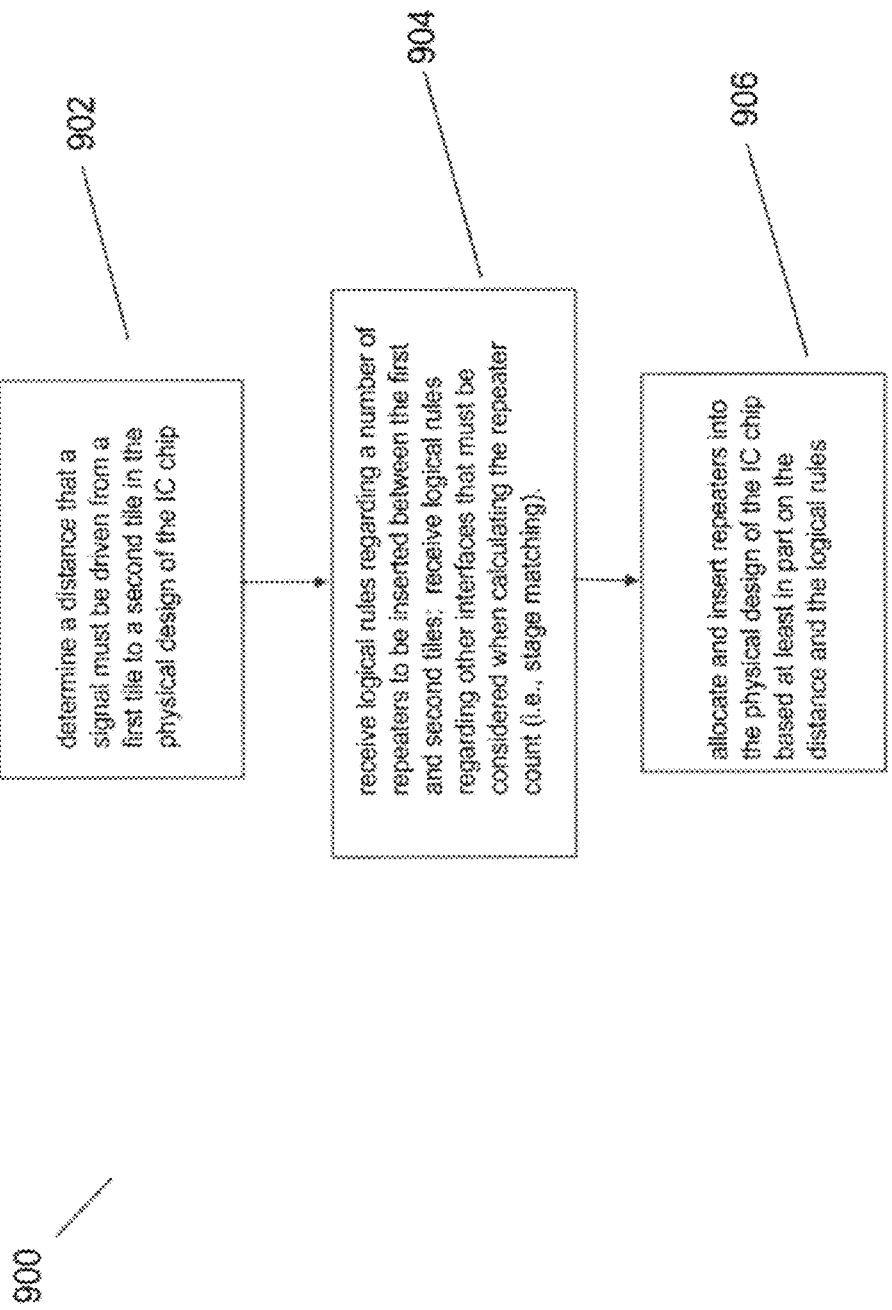

FIG. 9 is an illustration of an exemplary method of practicing an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

A. Signal Pipelining Using Repeater Flops in Accordance with the Present Invention The present invention overcomes the distance limitations associated with the use of conventional buffer-type repeaters (i.e., the limit on the distance a signal can be driven in a single clock cycle). This limitation is overcome by applying a novel pipelining approach in which a signal path between two tiles is broken down into a series of stages, in which each stage carries a different "phase" of the signal. In order to implement this approach, an embodiment of the present invention uses a new type of repeater, referred to herein as a "repeater flop". A repeater flop may be implemented as a flip flop with an associated buffer that is used for driving the signal. Through the application of a clock signal to each of the repeater flops along an interconnect, a signal can be driven across the interconnect by traveling from one repeater flop to another per clock cycle. For example, assume that in a given clock cycle (500 MHz=>2 nS) a signal can only be driven about 5 mm using 4 conventional buffer-type repeaters. By using the pipelining technique of the present invention, the signal can be driven further—for example, 20 mm. In accordance with this approach, the latency of the signal will still be 20 mm/5 mm*2 nS=8 nS. But every clock cycle we will get a new value of the signal. It should be noted that this approach is particularly well-suited for graphics chips, which are very amenable to pipelining.

Figure 1:
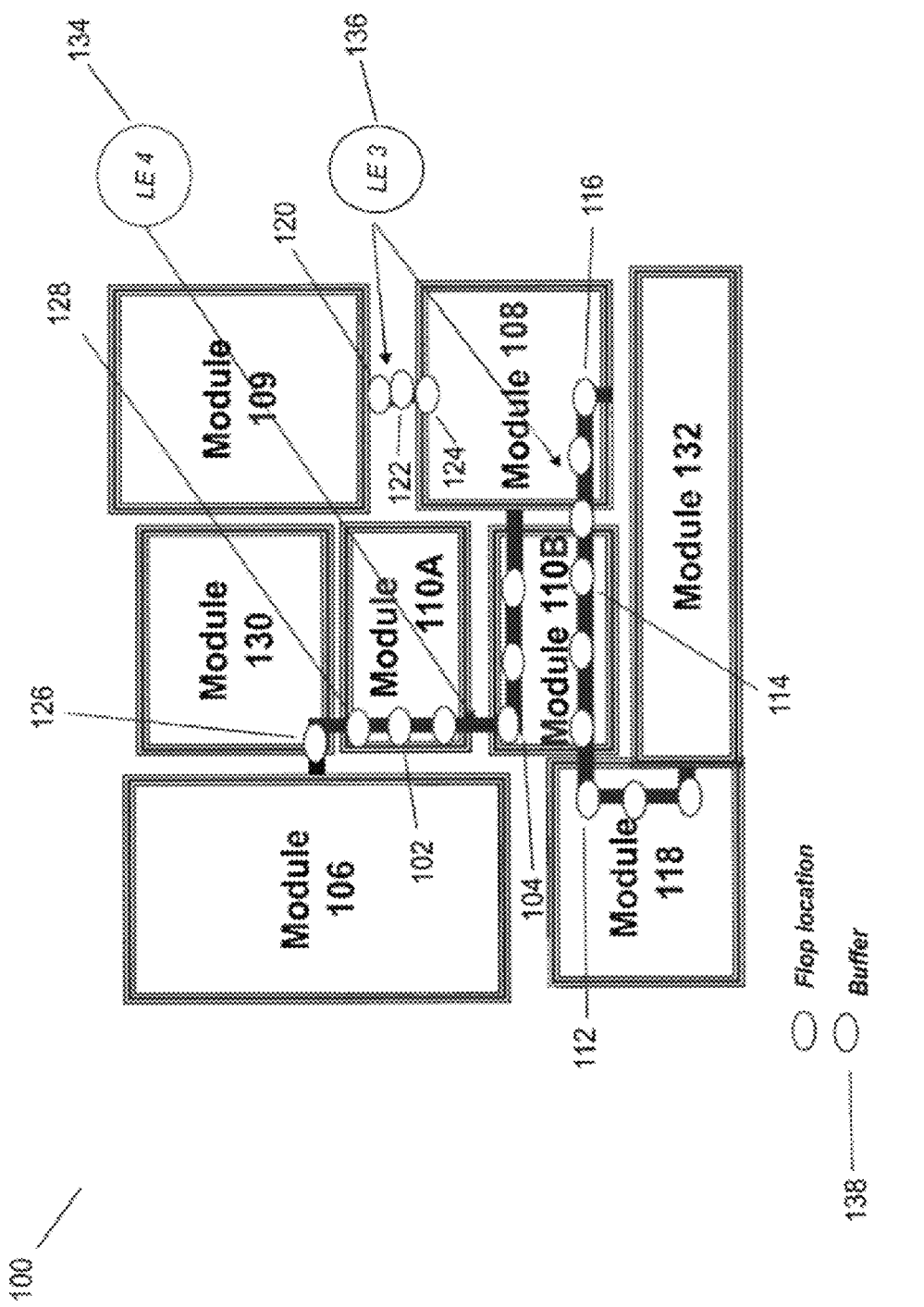
FIG. 1 is an illustration of the automatic allocation and insertion of repeater flops and buffer-type repeaters into the physical design of an IC chip in accordance with an embodiment of the present invention.

FIG. 1 depicts a physical design of an IC chip 100 in which repeater flops have been allocated and inserted into tiles (the tiles are referred to as "modules" in FIG. 1). Repeater flops are configured to carry signals from one tile to another in a pipelined fashion. As shown in FIG. 1, two repeater flops 102 and 104 have been inserted to carry a signal from module 106 to module 108, wherein the first repeater flop 102 is inserted in an upper module 110A and the second repeater flop 104 is inserted in a lower module 110B. As a result, an interconnect between the module 106 and the module 108 has been divided into three pipelined stages. Other repeater flops 112, 114, and 116 have also been inserted to create a three-stage pipeline between the module 108 and a module 118. Still other repeater flops 120, 122, and 124 have been inserted to create a three-stage pipeline between the module 108 and a module 109.

In addition to repeater flops, the physical design depicted in FIG. 1 also includes conventional buffer-type repeaters, such as buffers 126 and 128 inserted between the module 106 and the repeater 102. Modules 130/132 are discussed below, along with interface rules 134/36, and buffer 138.

B. Automated Repeater Flop Allocation and Insertion in Accordance with the Present Invention The use of repeater flops, as described above, can lead to significant challenges. For example, repeater flops are much larger than conventional buffer-type repeaters. Thus, chip designers must be careful where the repeater flops are placed. Additionally, as also noted above, repeater flops require a clock signal. Since different clocks are typically provided and used within an IC chip, a repeater flop cannot be associated with just any signal wire. Rather, a repeater flop can only be associated with a signal wire that shares the same clock (also referred to as sharing the same "clock color"). Furthermore, the addition of clocked elements, such as repeater flops to a chip design, has an impact on the functionality of the design. Typically, the design must be altered in some way to account for the additional latency.

The present invention provides a design tool that automatically allocates and inserts repeater flops into the tiles of an IC chip in a manner that addresses the foregoing challenges. This design tool is used to allocate and insert repeater flops into the tiles of an IC chip that are used for driving signals along wires that cross or "fly" over the tiles of the IC chip. The automated design tool identifies ideal or optimal placement of repeater flops (and an associated wire or bus) based on a set of predefined constraints or factors. As will be described in more detail herein, the automated design tool can also be used for initial floorplan verification and bus planning.

Embodiments of the present invention are provided by way of example only and are not intended to limit the invention. The following steps will be described in reference to FIGS. 1 through 4.

1. Specification of Interface Rules by Logic Designers

In the first step of the process, logic designers specify which of the signals that are to be carried from one tile to another can be repeated. For each signal that can be repeated, the logic designers specify a constraint on the number of repeater flops that can be used to carry the signal. This constraint may be a maximum number of repeater flops that may be used (e.g., less than or equal to three) or a specified number of repeater flops that must be used (e.g., equal to two). In effect, a constraint on the number of repeater flops used to carry a signal is a constraint on the number of pipelined stages through which the signal will be driven. The logic designers can also specify which signals must be repeated using the same number of pipelined stages. Finally, the logic designers also specify the appropriate clock color to be used for pipelining a given signal. This may be, for example, a system clock or a memory clock.

All of the foregoing constraints, termed "interface rules," are stored in a file in a predefined structured manner. In an embodiment of the present invention, the interface rules are stored in an XML (Extensible Markup Language) file, although the invention is not so limited.

Figure 2:
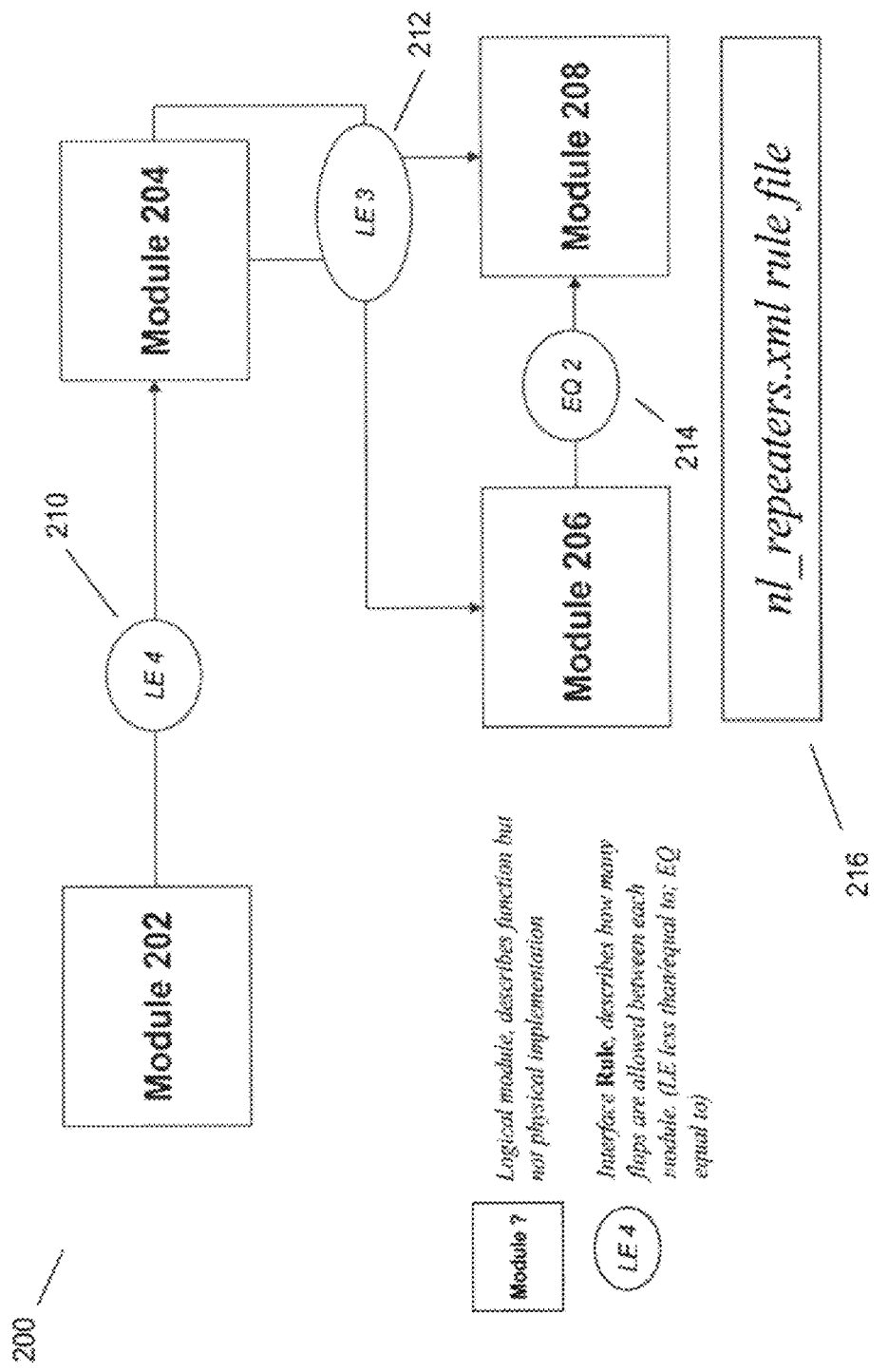
FIG. 2 is an illustration of the specification of interface rules for carrying signals between logical modules of an IC chip design and the compilation of such rules in a file in accordance with an embodiment of the present invention.

FIG. 2 is an illustration of the specification of interface rules 200 for carrying signals between logical modules of an IC chip design and the compilation of such rules in a file as previously described. In particular, FIG. 2 illustrates relationships defined by logic designers between various modules of a logical design of an IC chip. By way of example, FIG. 2 includes modules 202, 204, 206, and 208. Each of the modules 202, 204, 206, and 208 is essentially a set of Verilog code, which is also referred to as RTL (Register Transfer Language). Verilog is an executable specification that can be used both for logical simulation and also for translation into a real physical implementation through execution of a well-known, albeit complex, process. As such, each of the modules 202, 204, 206, and 208 may be thought of as a description of what a particular block in the IC chip may be required to accomplish.

As part of the design of the modules 202-208 shown in FIG. 2, logic designers specify interface rules 210, 214, and 214 that set limits on how signals may be pipelined between such modules of the IC chip. The logic designers derive these rules based on their innate knowledge of the design of the logic modules 202-208 and their various interrelationships. For example, the logic designer may determine whether adding a certain number of pipeline stages is acceptable from the point of view of functionality and/or performance.

Where multiple logical designers are working on the same design, the designers may collaboratively derive the interface rules. Ideally, the interface rules are specified in such a way that they are as flexible as possible. For example, whenever possible, the logic designers may place only an upper limit on the number of repeater flops that can be used to implement a pipelined interconnect rather than specifying a single acceptable number of repeater flops.

As shown in FIG. 2, interface rules 210, 212, and 214 have been specified to dictate the number of repeater flops that are allowed between respective logical modules 202-208. For example, the interface rule 210 is associated with a bus between the module 202 and the module 204. The interface rule 210 requires that less than or equal to four repeater flops may be used to create a pipelined bus between the modules 202 and 204. As a further example, the interface rule 212 is shown as applying to the modules 204 and 208 and it applies to the modules 204 and 206, such that both interfaces must use the same number of repeater flops and the number of repeater flops must be less than or equal to three. In yet another example, an interlace rule 214, between the modules 206 and 208, requires that the number of repeater flops used in the interface between the modules must be equal to exactly two.

As noted above, the interface rules 210-214 are stored in a file in a predefined structured manner. By way of example, in FIG. 2, a file 216 is an XML file denoted "n1_repeaters.xml rule file." As will be appreciated by persons skilled in the art, XML provides a simple and flexible text format for providing data in a structured manner that is particularly well-suited for computer processing. The XML file 216 is provided to the physical designers for use by a software design tool as will be described in more detail herein. The rules file may be created by hand or in an automated fashion, or as a combination of manual and automated steps.

2. Stripping of Top Level Repeaters from Logical Netlist

The logical netlist of the IC chip is next stripped of any top level repeaters that may have been inserted by the logic designers. The number and name of the stripped repeaters is recorded. Stripping such repeaters from the logical netlist makes floorplanning easier as it removes what is at this point essentially an unnecessary constraint on the design of the top level of the IC chip.

3. Floorplanning of IC Chip

Next, the chip is floorplanned—in other words, tiles and tile ports are arranged in the context of the full chip. An automated design tool, in accordance with an embodiment of the present invention, is used during this stage to determine, for a given arrangement of tiles and tile ports, if the proper interconnections have been made and if the interface rules provided by the logic designers have been satisfied. Thus, there are at least three inputs to the automated design tool: (1) the physical floorplan; (2) the top-level netlist describing how the modules are connected; and (3) the interface rules file. An output of the automated design tool is a specification of how many repeater flops must be used to implement each wire (also referred to as "net") that interconnects one tile to another. As used herein, an interface comprises a plurality of busses, and a bus comprises a plurality of wires or nets.

In part, the automated design tool calculates the distance between the start and end points of each signal that must be carried between tiles and the maximum distance for a given clock stage is applied. Using the rules in an interface rules file, the automated design tool determines the minimum number of repeater flops required for each signal wire. At this point, the physical designers can inform the logic designers how many repeaters they plan to use. This forms a contract between the logic designers (also referred to as the "front end") and the physical designers (also referred to as the "back end"). The front end reincorporates these repeaters into the logical netlist for simulation and logic verification.

Figure 3:
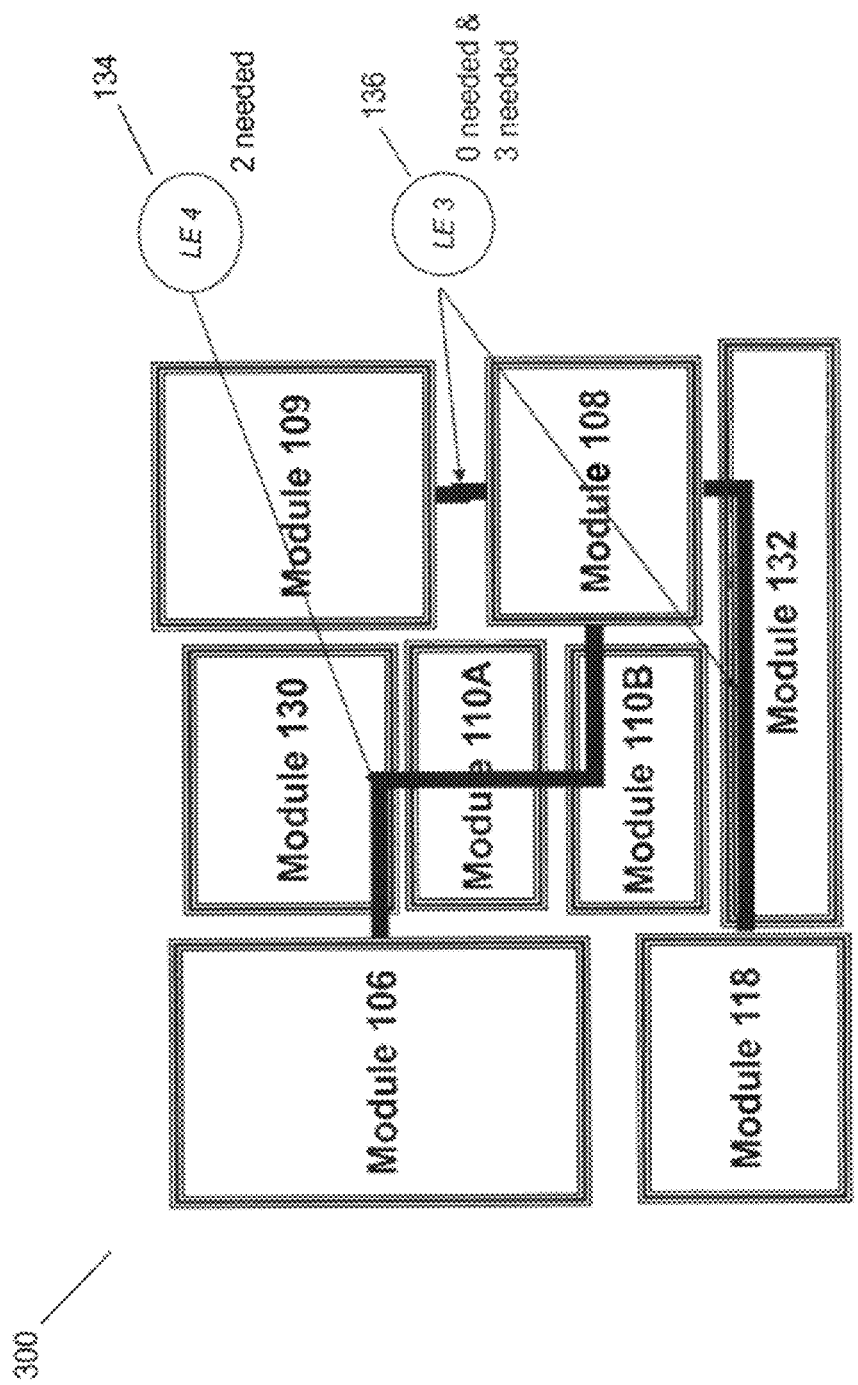
FIG. 3 is an illustration of a floorplan of an IC chip that is tested for compliance with a set of interface rules using an automated design tool in accordance with an embodiment of the present invention.

This floorplanning step will now be further described with reference to FIG. 3. FIG. 3 is an illustration of an example floorplan 300 for the modules 106, 108-110, 118, 130, and 132 within the chip 100, shown in FIG. 1. Note the two instances of the module 110 (110A and 110B), which will be identical from a design perspective. The ability to replicate physical modules creates efficiencies in chip design and thus designing identical modules may be a goal of the physical designers. The modules 106 and 108-110 in FIG. 3 are structurally similar to the logical modules 202, 204, 208, and 208, respectively illustrated in FIG. 2.

Based on the example floorplan 300 of FIG. 3, the automated design tool determines that two repeater flops are required to implement a pipelined bus from the module 106 to the module 108, zero repeater flops are required to implement a pipelined bus from the module 108 to the module 109, and three repeater flops are required to implement a pipelined bus from the module 108 to the module 118. Since the interface rule 134 for the modules 106 and 108 requires that less than or equal to four repeater flops be used to implement a bus between the two modules, the automated design tool will indicate that this bus satisfies the interface rule. Furthermore, the modules 109 and 108 and the modules 106 and 118 share the same interface rule 136, which requires that these busses must have less than or equal to three repeater flops and that these busses must have an identical number of repeater flops. Therefore, the automated design tool will indicate that the bus from the module 108 to the module 109 must have three repeater flops, even though the bus physically (i.e., from a distance perspective) does not require any.

Since the floorplanner can now estimate accurately the number of repeater flops needed per wire, experiments can be done on various floorplan configurations. In some cases, the floorplanner may want to move module ports (egress points for signals) to a non-optimal location with respect to shortest distance routing (also referred to as "Manhattan" style routing). If such a move does not require extra repeater flops to be added, as can be determined using the automated design tool, then the move is essentially free.

By way of background, the distance between the start and end points of signals traveling within a chip is calculated and the max distance for a given clock stage applied. Using the rules in the n1_repeaters.xml file 216, a minimum number of flip flops required for each signal wire can be determined. Additionally, at this point, the logic designers can be told how many flip flops are required.

4. Bus Planning

The path the main signal busses take across the chip can now be planned. This can be done either manually or automatically. In bus planning, the floorplanner can choose "detour routes" for the busses which vary from an original bus plan. This can be done to help balance the allocation of resources between the top level of the IC chip and the tile level. The automated design tool can be used to verify that the busses still satisfy the interface rules. As long as the busses satisfy the interface rules, the floorplanner has considerable flexibility concerning where the busses are positioned.

Figure 4:
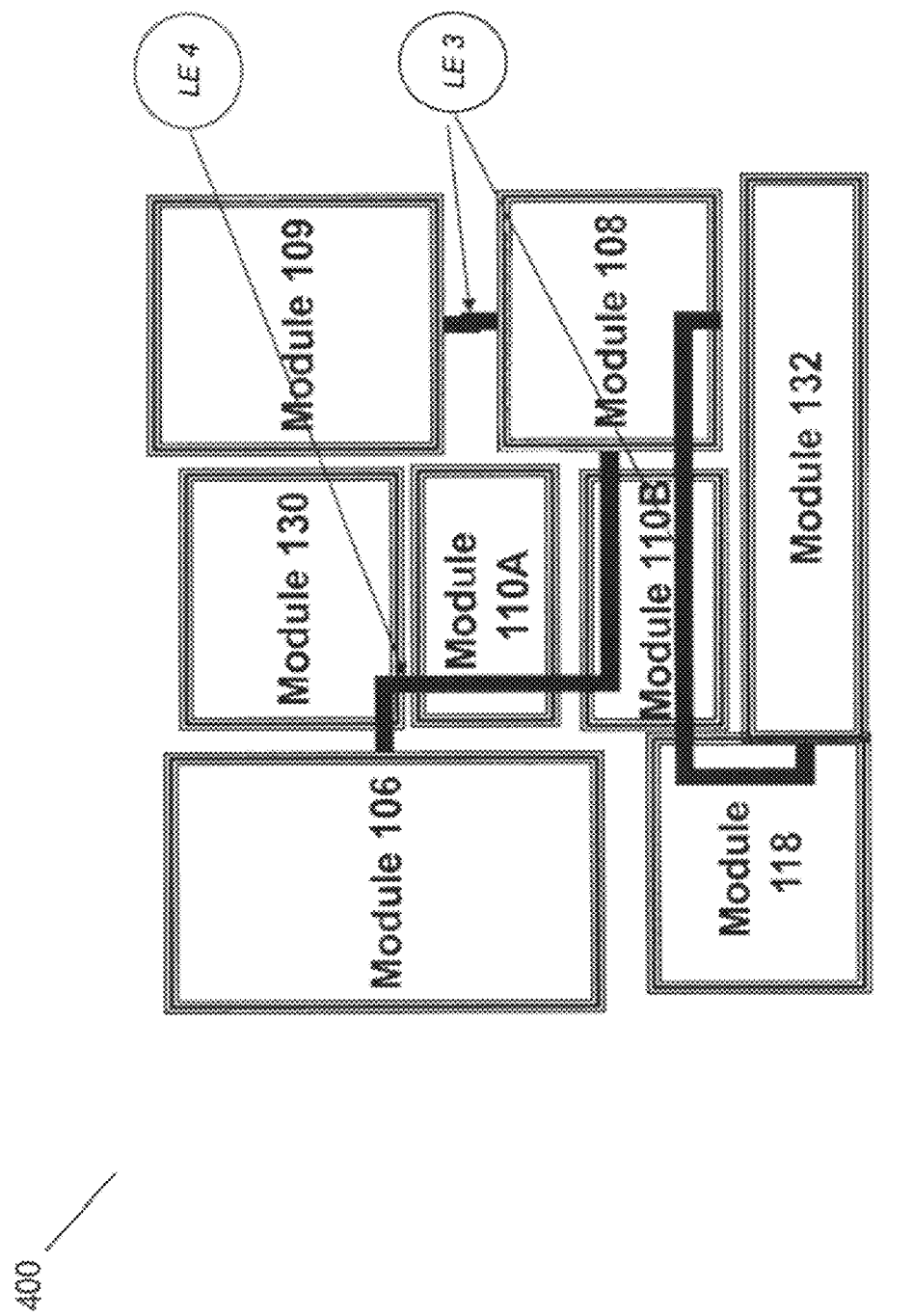
FIG. 4 is an illustration of the placement of busses across tiles of an IC chip during a bus planning phase in accordance with an embodiment of the present invention.

FIG. 4 is an illustration of a bus planning step 400, which shows that the actual placement of busses between the tiles of the IC chip has been altered with respect to the original placement, shown in FIG. 3. In particular, the bus from the module 106 to the module 108 has been forced over the left side of the "upper" module 110A. The bus from the module 108 to the module 118 has been forced over the module 118 and the lower portion of the "lower" module 110B, thereby avoiding the module 132 entirely. There may be a variety of reasons why the floorplanner does not desire to place a bus over the center of the upper module 110A or over the module 132. For example, the floorplanner may know that these modules do not have repeaters in them or that perhaps the module includes a very sensitive analog block that should be avoided from a bus planning perspective.

FIG. 4 further illustrates that even within the context of the interface rules there is some flexibility in terms of how the floorplanner lays out the busses. The process, as described above, is more concerned with where each module is placed and where the interface pins are located on that module. In the bus planning step, the floorplanner can provide another level of refinement in which he or she can plan where the busses are to be placed. The automated software tool provides the floorplanner with the ability to arbitrarily plan where a bus goes while satisfying certain predefined constraints, such as the interface rules.

5. Ideal Repeater Insertion

Ideal locations for both repeater flops and conventional buffer-type repeaters can now be assigned to the underlying tiles. The locations are "ideal" in the sense that they are optimal or satisfactory from the perspective of the floorplanner, but may not account for the realities of the physical design of the underlying tile.

Based on the length of a bus, a certain number of repeater flops are necessary to implement the bus, and a certain number of buffer-type repeaters are be needed to implement each pipeline stage. This is due to physical constraints associated with the technology being used to implement the IC chip. The automated design tool of the present invention can be used to automatically allocate and insert these repeaters in accordance with these physical constraints in addition to the interface rules previously discussed. Other factors that may be taken into account by the automated design tool, when performing repeater allocation and insertion, include (i) whether a given tile is "frozen" such that design changes cannot be applied to them, and (ii) the presence or absence of "loose" repeaters in the tile (i.e., repeaters that are present in the design but are not dedicated to a particular signal wire). Also included is (iii) the inability of a tile to insert repeaters based on design reasons, such as the partial obstruction of a repeater within a tile due to perhaps the presence of RAMs. These factors will be discussed in more detail below.

By way of review, FIG. 1 is an illustration of the automatic allocation and insertion of repeater flops along the busses described above with reference to FIG. 4. As can be seen in FIG. 1, the two repeater flops 102 and 104 and five buffer-type repeaters 138 are allocated and inserted to implement the bus from module 106 to module 108, three repeater flops 120, 122, and 124 are allocated and inserted to implement the bus from the module 108 to the module 109, and three repeater flops 112 and 114 and six buffer-type repeaters 138 are allocated and inserted to implement the bus from the module 108 to the module 118.

Figure 5:
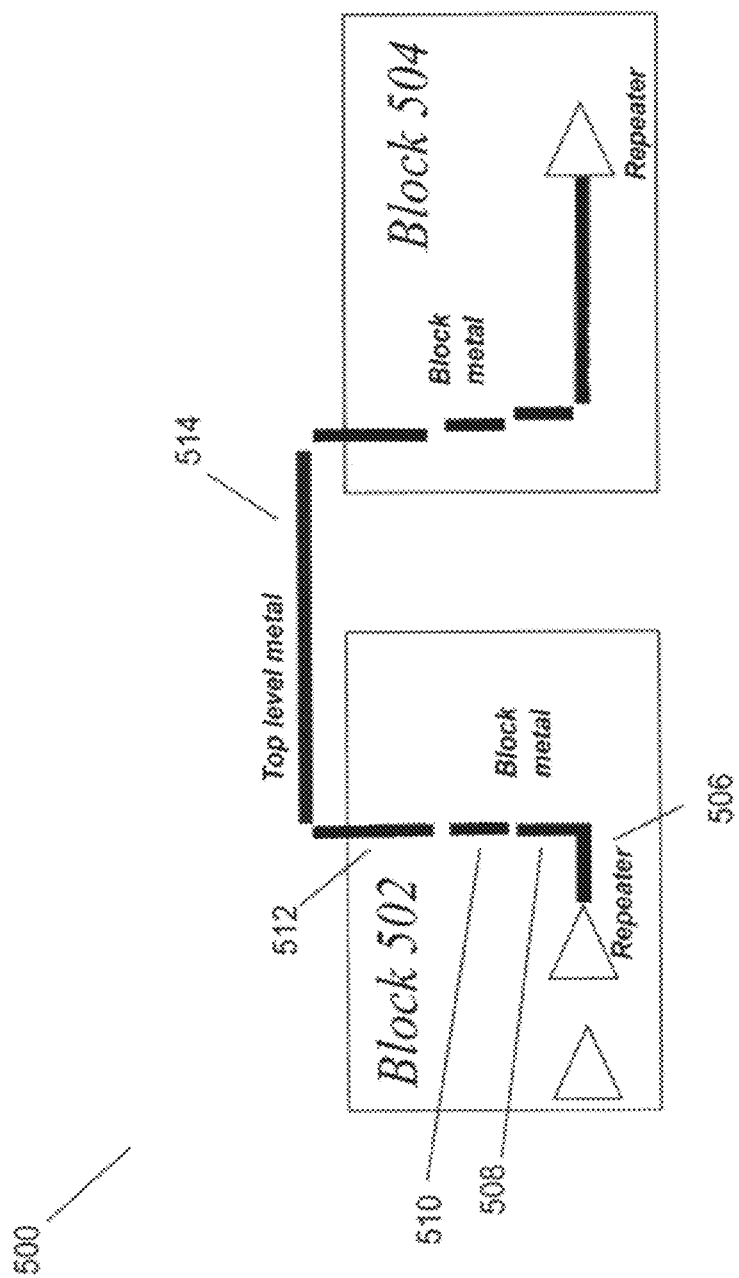
FIG. 5 is an illustration of the manner in which repeaters are physically inserted into a tile or "block" of an IC chip in accordance with an embodiment of the present invention.

FIG. 5 is an illustration 500 conveying the manner in which repeaters are physically inserted into a tile or "block." As shown in FIG. 5, a repeater in block 502 is connected to a repeater in block 504. Because the flip flops and buffers that are used to implement repeaters in accordance with the present invention are active devices (e.g., transistors), they are implemented in silicon on the bottom layer of the IC chip. Wiring for the IC chip is implemented via multiple metal layers, which are the upper layers of the IC chip.

As shown in FIG. 5, the wiring from the repeater in the block 502 to the repeater in the block 504 transitions through four block metal layers 506, 508, 510, and 512 (i.e. base layers) to connect with a top level metal layer 514. the top level metal layer 514 is used for top level routing. The portion of a metal layer (see, e.g., the layer 512) that emerges from the block is called a "pin." When a bus crosses a block and a repeater is required, the automated design tool will insert the repeater itself into the tile even though the requisite metal interconnect may not yet be available.

Figure 6:
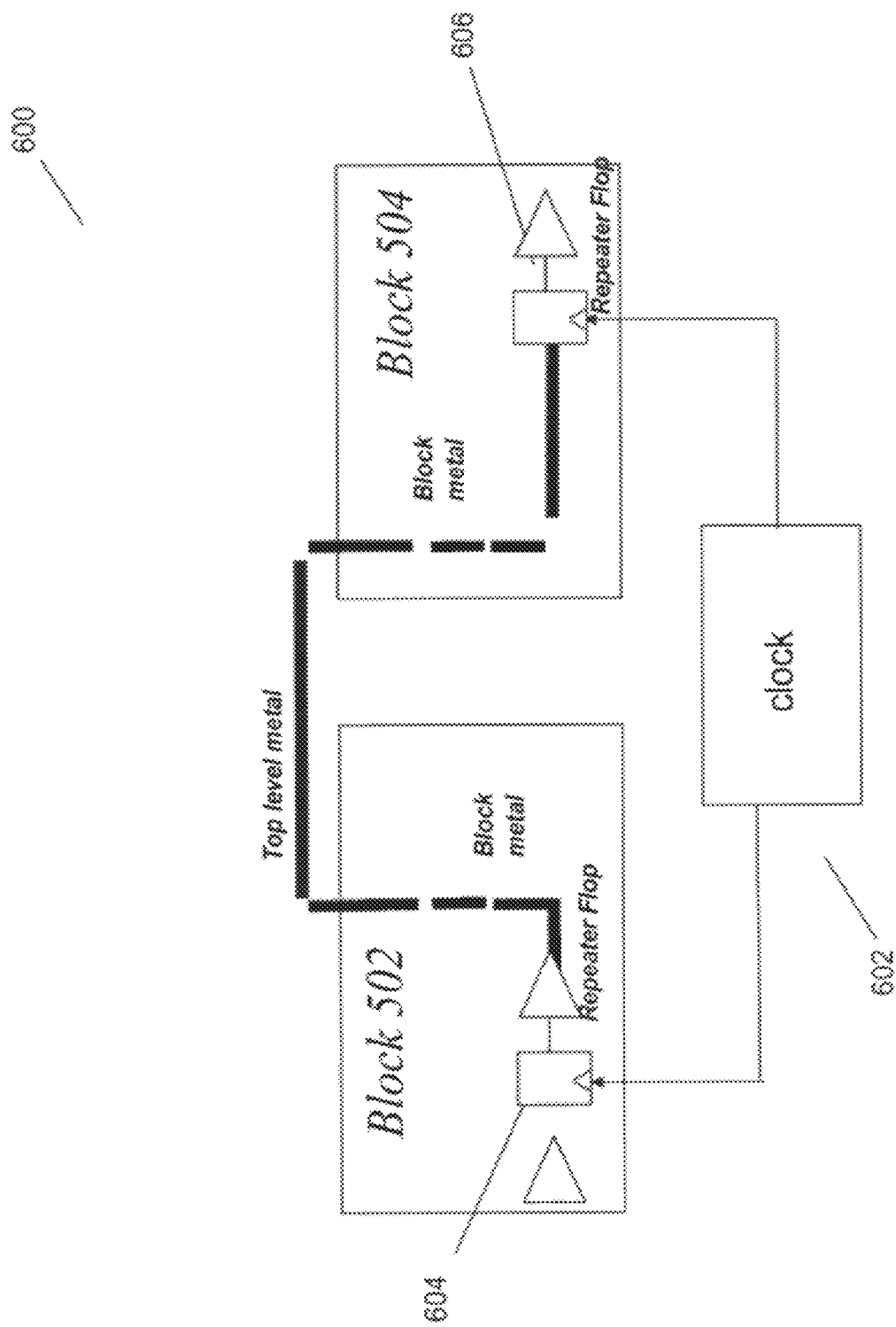
FIG. 6 is a more detailed illustration of the embodiment of FIG. 5 showing a signal timing process.

FIG. 6 is a more detailed illustration of the embodiment of FIG. 5 showing a signal timing process 600. In FIG. 6, an exemplary clock 602 provides timing signals to a repeater flop 604 and a repeater flop 606. As noted above, by application of a clock signal to each of the repeater flops, such as the repeaters flops 604 and 606 along an interconnect, a signal can be driven across the interconnect by traveling from one repeater flop to another per clock cycle.

FIG. 7 is an illustration of a circuit arrangement 700, that is an alternative embodiment of the illustration shown in FIG. 6. More specifically, the circuit arrangement 700 is an illustration of repeater flops and their associated clock color attributes. As discussed above, unlike repeater buffers, repeater flops have an associated clock (i.e., clock color attribute). Each signal wire (or bus) also has a clock color. As used herein, the "color" of a clock refers to the basic clock source, e.g. 425 MHz. The repeater flop color desirably matches the bus clock color. That is, timing schemes of signals received within one repeater flop are uniquely matched to a clock dedicated to that particular repeater flop.

For example, in FIG. 7, a signal X is received as an input to the circuit arrangement 700. A clock 702 matches the color of repeater flops 704 and 706, and is uniquely associated with a timing sequence of the signal X. In other words the signal X, associated with the clock 702, can only use the flops 704 and 706. Similarly, a signal Y is also received as an input to the circuit arrangement 700. A clock 708 matches the color of repeater flops 710 and 712, and is uniquely associated with the timing sequence of the signal Y. The signal Y, associated with the clock 708, can only use the flops 710 and 712. In this manner, the circuit arrangement 700 can efficiently accommodate multiple signals having different timing schemes.

FIG. 8 is an illustration 800 showing repeater flop insertion from the block or tile perspective. In FIG. 8, for example, two repeater banks 802 are provided for a vertical bus. Similarly, three repeater banks 804 are provided for a horizontal bus.

The physical designers of the underlying blocks receive instructions based upon the fall chip floorplan and inserts repeater banks, such as the repeater banks 802 and 804, where requested (or as close as possible). The path that the top level bus makes as it crosses the underlying block is also recorded. This information can be used to allocate routing resources between the top level and the underlying block in an optimal manner; presumably under these regions more resources would be allocated to the top level. In order that the repeater flop banks are accessible to the top level routes, the underlying block must provide pins 806 so that the repeater flops can be accessed.

In FIG. 8, each of the repeater banks 802 and 804 has its own set of pins. This is significant because it allows the block repeaters to be used in multiple situations—the bus may travel from right to left or left to right. These banks come between repeater flop banks. For example, the maximum allowable distance between repeater flop banks may be 5 mm whereas the maximum allowable inter-buffer distance may be 1 mm. Not shown in FIG. 8 are the repeater buffer banks.

6. Compensation for Frozen Tiles and Other Constraints

The ideal design flow is fairly straightforward: plan the busses, calculate the repeater locations, insert the repeaters into the tiles and finally hook up the repeaters at the top level. However, in reality, this seldom happens. More typically, at a certain point in the design flow, certain tiles are finished (in a design sense) before the top level. These tiles are then frozen such that their physical design cannot be changed. An automated design tool in accordance with the present invention will take into account that the design of frozen tiles cannot be altered when performing bus planning and repeater allocation and insertion. For example, the automated design tool will only use repeaters that are already available in a frozen tile but will not insert any repeaters into the tile.

Other constraints that may emerge from the design flow result from the use of multiple instances of the same tile (for example, the upper and lower modules 110A and 110B in FIGS. 1-4). For these tiles, if a repeater is inserted into one instance, it should also be inserted into all other instances. Thus, the resulting repeater insertion for any given instance is the union of all repeaters inserted into all instances. Where repeater insertion is driven by bus planning (i.e., the repeaters are "planned" repeaters), this may become undesirably complex. One manner of dealing with this is to instead insert a general pattern of "loose" repeaters into each instance of the tile, wherein the "loose" repeaters are not associated with a particular wire. The floorplanner is then limited to working with the "loose" repeaters that are available in order to perform top level routing. An automated design tool, in accordance with the present invention, automatically detects and incorporates such "loose" repeaters when performing the allocation and insertion function.

Still another constraint that can emerge from the design flow process is that some underlying tiles may not be able (for design reasons) to insert repeaters as requested. In this case, the automated design tool will avoid insertion of a repeater into such tiles, or into designated regions of such tiles.

Another common constraint is the presence of random access memories (RAMs) in the tile. RAMs are predefined cells or "hard macros" and cannot have repeaters inserted into them. Since they are large, they disrupt the insertion of the repeaters. The automated design tool can "see" the RAM locations and where possible avoid such placement conflicts.

7. Assembly of Repeaters into Banks

Next, tile repeaters are assembled in banks and the banks are named. For additional flexibility banks can be assigned to signals by name. One bank may be assigned to multiple signal busses. Assignment within a bank to a group of signal busses is important.

8. Logical Equivalency Check

Finally, the repeaters used for each signal are mapped to the original set used in the front end netlist. This mapping is sent to a Logical Equivalency Checker which makes sure that the logic and physical designs are functionally equivalent. Without this mapping, the logical equivalency check (LEC) would fail or would have an inordinate run time.

The key difference between repeater flops and buffer-type repeaters is that unlike buffer-type repeaters, repeater flops actually change the "state" of the design. In other words, the insertion of repeater flops has an impact on the logical design of the IC chip.

A key technique in modern VLSI design is logical equivalency mapping. The logical netlist must be morphed and altered so much, in order to comply with the physical design constraints, that it is nearly impossible to do a direct comparison with the incoming netlist with the final design. So instead, what is known as a logical equivalency check (LEC) is performed. LEC depends upon certain anchor points—flops—and that these flops have equivalent names in both versions of the netlist. Due to the foregoing processing steps, this assumption can be broken. Therefore, to allow the LEC to function smoothly, a mapping file is created between the logical repeater names and their physical counter parts. The LEC Mapping file produced by the flow is essential for closing the loop between front-end and back-end design flows.

FIG. 9 is an illustration of an exemplary method 900 of practicing an embodiment of the present invention. In the method 900, a distance that a signal must be driven from a first tile to a second tile in the physical design of the IC chip is determined in step 902. In step 904, logical rules are received regarding a number of repeaters to be inserted between the first and second tiles. Other logical rules can also be received regarding other interfaces that must be considered when calculating the repeater count (i.e., stage matching). In step 906, repeaters are allocated and inserted into the physical design of the IC chip based at least in part on the distance and the logical rules.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for automated allocation and insertion of repeaters into a physical design of an integrated circuit (IC) chip, comprising:
receiving logical rules regarding a number of repeater flops to be inserted in a pipelined routing of a signal between first and second tiles; and
allocating and inserting the repeater flops into a physical design of the IC chip based at least in part on the logical rules, an inter-tile routing distance associated with the pipelined routing of the between the first and second tiles, and a repeater-flop routing distance associated with the repeater flops,
wherein each repeater flop is associated with a different phase of a clock signal,
wherein each repeater flop comprises a flip-flop, and
wherein the receiving and the allocating are performed by one or more processing devices.

2. The method of claim 1, further comprising determining the inter-tile routing distance that the signal is driven from the first tile to the second tile in the physical design of the IC chip based on an automatic calculation or a user provided input.

3. The method of claim 1, further comprising uniquely associating at least one clock to a set of the repeater flops.

4. The method of claim 1, wherein the allocating and inserting repeater flops into the physical design includes considering interface rules, wherein the interface rules include at least one of a maximum number of repeater flops, a required number of repeater flops, and a number of repeater flops equal to a number of repeater flops in another pipeline routing.

5. The method of claim 1, wherein the allocating and inserting includes considering frozen tiles.

6. The method of claim 1, wherein the allocating and inserting includes considering a presence or absence of loose repeater flops.

7. The method of claim 1, wherein the allocating and inserting includes considering an inability to insert repeater flops based on a partial obstruction associated with at least one of the first and second tiles.

8. An apparatus for automated allocation and insertion of repeater flops into a physical design of an integrated circuit (IC) chip, the apparatus configured to:
receive logical rules regarding a number of repeater flops to be inserted in a pipelined routing of a signal between first and second tiles; and
allocate and insert the repeater flops into the physical design of the IC chip based at least in part on the logical rules, an inter-tile routing distance associated with the pipelined routing of the signal between the first and the second tiles, and a repeater-flop routing distance associated with the repeater flops,
wherein each repeater flop is associated with a different phase of a clock signal, and
wherein each repeater flop comprises a flip-flop.

9. The apparatus of claim 8, further configured to determine the inter-tile routing distance that the signal is driven from the first tile to the second tile following a route that is automatically or user generated in the physical design of the IC chip based on an automatic calculation or a user provided input.

10. The apparatus of claim 8, further configured to uniquely associate at least one clock to a set of the repeater flops.

11. The apparatus of claim 8, wherein the allocating and inserting repeater flops into the physical design comprises consideration of interface rules, wherein the interface rules include at least one of a maximum number of repeater flops, a required number of repeater flops, and a number of repeater flops equal to a number of repeater flops in another pipeline routing.

12. The apparatus of claim 8, wherein the allocating and inserting the repeater flops includes consideration of frozen tiles.

13. The apparatus of claim 8, wherein the allocating and inserting the repeater flops includes consideration of an absence or a presence of loose repeater flops.

14. A non-transitory tangible computer readable medium carrying one or more sequences of one or more instructions for execution by one or more processors to perform a method for automated allocation and insertion of repeaters into a physical design of an integrated circuit (IC) chip, comprising:
receiving logical rules regarding a number of repeater flops to be inserted in a pipelined routing of a signal between first and second tiles; and
allocating and inserting the repeater flops into the physical design of the IC chip based at least in part on the logical rules, an inter-tile routing distance associated with the pipelined routing of the signal between the first and the second tiles, and a repeater-flop routing distance associated with the repeater flops,
wherein each repeater flop is associated with a different phase of a clock signal, and
wherein each repeater flop comprises a flip-flop.

15. The non-transitory tangible computer readable medium of claim 14, further comprising determining the inter-tile routing distance that the signal is driven from the first tile to the second tile in the physical design of the IC chip based on an automatic calculation or a user provided input.

16. The non-transitory tangible computer readable medium of claim 14, further comprising uniquely associating at least one clock to a set of the repeater flops.

17. The non-transitory tangible computer readable medium of claim 14, wherein the allocating and inserting repeater flops into the physical design includes considering interface rules, wherein the interface rules include at least one of a maximum number of repeater flops, a required number of repeater flops, and a number of repeater flops equal to a number of repeater flops in another pipeline routing.

18. The non-transitory tangible computer readable medium of claim 14, wherein the allocation and inserting includes considering frozen tiles.

19. The non-transitory tangible computer readable medium of claim 14, wherein the allocating and inserting includes considering a presence or absence of loose repeater flops.

20. The non-transitory tangible computer readable medium of claim 14, wherein the allocating and inserting includes considering an inability to insert repeater flops based on a partial obstruction associated with at least one of the first and second tiles.

* * * * *